I. C. STORY.
Dummy Engine.
No. 51,098.
Patented Nov. 21, 1865.
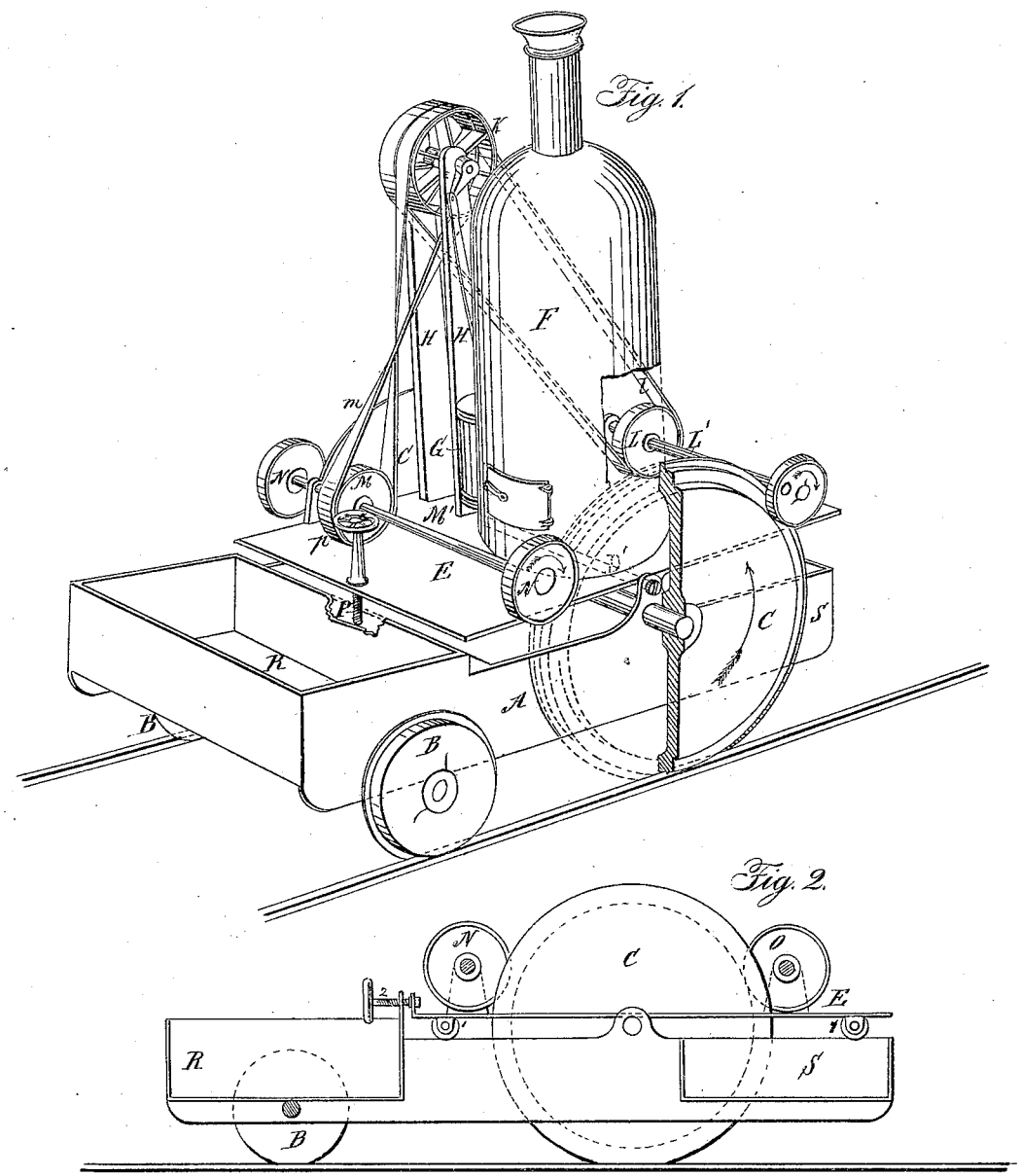
Witnesses:
Inventor:

UNITED STATES PATENT OFFICE.

IRA C. STORY, OF CINCINNATI, OHIO.

IMPROVEMENT IN RUNNING-GEAR OF STREET-LOCOMOTIVES.

Specification forming part of Letters Patent No. 51,098, dated November 21, 1865.

*To all whom it may concern:*

Be it known that I, IRA C. STORY, of Cincinnati, Hamilton county, and State of Ohio, have invented a new and useful Improvement in Street-Locomotives, of which the following is a full and clear description thereof, reference being had to the accompanying drawings, forming a part of this specification.

My invention relates to a new device by which the locomotive may be instantly stopped or its direction reversed without reversing the engine.

Figure 1 is a perspective view of my improved street-locomotive. Fig. 2 is a longitudinal section through part of the locomotive, showing a modified arrangement of part of the machinery.

A represents the main frame, which is supported upon two truck-wheels, B, and the two drivers C. The axle-tree D' supports a vibrating platform, E, upon which is secured the boiler F and engine G H on standards which rise vertically from the platform E and afford journal-bearings for the main shaft I, having a drum, K. The drum K communicates motion to the pulleys L and M by means of the straight belt $l$ and cross-belt $m$. The pulleys L and M are keyed fast to their shafts L' and M', which are journaled respectively to the back and front parts of the platform E. The shafts L' and M' are provided with friction-rollers N and O.

P is a screw provided with a hand-wheel, $p$, by means of which the platform E may be vibrated upon the axle-tree D', so as to throw either set of friction-rollers N or O in contact with the driving-wheels C.

The front portion, R, of the platform or frame serves as a receptacle for fuel, while the rear part, S, contains the water-tank for supplying the boiler.

Operation: The locomotive may be supposed to be running forward, as shown in the drawings. When it is desired to reverse it, so as to run backward, the hand-wheel $p$ of the screw P is turned so as to elevate the front end and depress the rear end of platform E, which forces the rollers O from the drivers C and places the rollers N in contact with said drivers, which operation immediately reverses the direction of the locomotive, thus obviating the necessity of reversing the engine, which may be in constant operation.

By strongly depressing the platform by means of screw P the friction-rollers N and O may be caused to bear so hard upon the drivers C as to act in place of brakes.

A modification of my improvement is shown in the longitudinal sectional view, Fig. 2. Instead of making the platform E vibratory, it is placed upon rollers 1, and a horizontal screw, 2, moves platform E back and forth, causing friction-wheels O and N to come in contact with the drivers C.

Having described my improvements in street-locomotives and the operation of its various parts, I make the following claims:

1. The vibrating platform E, friction-wheels O and N, and screw P, in combination with the driving-wheels C, operating as above described, and for the purposes set forth.

2. In the modified form, the platform E, rollers 1, and screw 2, in combination with the driving-wheels C, as above described, and for the purpose set forth.

IRA C. STORY.

Attest:
WM. SLAUGHTER,
CHAS. DOEGEN.